(12) United States Patent
Keller et al.

(10) Patent No.: US 10,449,960 B2
(45) Date of Patent: Oct. 22, 2019

(54) CONTROL SYSTEM AND CONTROL METHOD FOR DETERMINING A LIKELIHOOD OF A LANE CHANGE BY A PRECEDING VEHICLE

(71) Applicant: TRW Automotive GmbH, Alfdorf (DE)

(72) Inventors: Martin Keller, Dortmund (DE); Christian Goette, Dortmund (DE); Torsten Bertram, Duesseldorf (DE); Andreas Homann, Dortmund (DE); Christian Wissing, Dortmund (DE); Karl-Heinz Glander, Monheim (DE); Carsten Hass, Duesseldorf (DE); Till Nattermann, Duesseldorf (DE); Markus Buss, Duesseldorf (DE)

(73) Assignee: TRW AUTOMOTIVE GMBH, Alfdorf (DE)

(*) Notice: Subject to any disclaimer, the term of this patent is extended or adjusted under 35 U.S.C. 154(b) by 120 days.

(21) Appl. No.: 15/673,668

(22) Filed: Aug. 10, 2017

(65) Prior Publication Data

US 2018/0043890 A1 Feb. 15, 2018

(30) Foreign Application Priority Data

Aug. 11, 2016 (DE) .................. 10 2016 009 762

(51) Int. Cl.
*B60W 30/095* (2012.01)
*B60W 30/08* (2012.01)
(Continued)

(52) U.S. Cl.
CPC ........ *B60W 30/0956* (2013.01); *B60W 30/08* (2013.01); *B60W 30/09* (2013.01);
(Continued)

(58) Field of Classification Search
CPC .......... B60W 30/0956; G06K 9/00798; G08G 1/166
See application file for complete search history.

(56) References Cited

U.S. PATENT DOCUMENTS

2009/0076702 A1* 3/2009 Arbitmann ............ B60W 10/06
701/96
2015/0321699 A1* 11/2015 Rebhan .................... B60Q 9/00
701/23
(Continued)

FOREIGN PATENT DOCUMENTS

| DE | 102007029483 | 1/2009 |
| DE | 102009007885 | 8/2010 |
| DE | 102012007389 | 10/2013 |

OTHER PUBLICATIONS

Wissing et al. Article entitled "Lane Change Prediction by Combining Movement and Situation based on Probabilities" (published Sep. 21, 2016).
(Continued)

*Primary Examiner* — Yazan A Soofi
(74) *Attorney, Agent, or Firm* — Tarolli, Sundheim, Covell & Tummino LLP

(57) ABSTRACT

A control system that is suitable for use in a host motor vehicle (10) is configured and intended for detecting (S100) another motor vehicle (20), using the road, located in front of the host motor vehicle (10) by means of the at least one surroundings sensor, determining (S106) a lateral movement of the other motor vehicle (20) relative to a lane (12, 16) in which the other motor vehicle (20) or the host motor vehicle (10) is present, and computing (S108) a movement-based likelihood of a lane change by the other motor vehicle (20), based on the determined lateral movement of the other motor vehicle (20). In addition, the control system is configured and intended for determining (S110, S112, S114) an
(Continued)

instantaneous traffic situation in accordance with the surroundings data obtained by means of the surroundings sensor, computing (S116) a traffic situation-based likelihood of a lane change by the other motor vehicle (20), based on the determined instantaneous traffic situation, and computing (S118) an overall likelihood of a lane change by the other motor vehicle (20), based on the movement-based likelihood and the traffic situation-based likelihood.

7 Claims, 9 Drawing Sheets

(51) Int. Cl.
*B60W 30/09* (2012.01)
*B60W 30/16* (2012.01)
*G06K 9/00* (2006.01)
*G08G 1/16* (2006.01)
*B60W 30/18* (2012.01)
*B60W 40/04* (2006.01)
*B60W 50/14* (2012.01)
*G06K 9/62* (2006.01)

(52) U.S. Cl.
CPC .......... *B60W 30/095* (2013.01); *B60W 30/16* (2013.01); *B60W 30/18163* (2013.01); *B60W 40/04* (2013.01); *B60W 50/14* (2013.01); *G06K 9/00* (2013.01); *G06K 9/00798* (2013.01); *G06K 9/6292* (2013.01); *G08G 1/166* (2013.01); *G08G 1/167* (2013.01); *B60K 2310/266* (2013.01); *B60W 2550/30* (2013.01); *B60W 2550/302* (2013.01); *B60W 2550/304* (2013.01); *B60W 2550/306* (2013.01); *B60W 2550/308* (2013.01); *B60W 2720/10* (2013.01)

(56) References Cited

U.S. PATENT DOCUMENTS

| | | | |
|---|---|---|---|
| 2016/0229395 A1* | 8/2016 | Schmudderich | G08G 1/162 |
| 2017/0369062 A1* | 12/2017 | Saigusa | B60W 30/16 |
| 2017/0369067 A1* | 12/2017 | Saigusa | B60W 30/18163 |
| 2018/0037227 A1* | 2/2018 | D'sa | B60W 50/04 |
| 2018/0050673 A1* | 2/2018 | D'sa | B60W 30/0953 |
| 2018/0059670 A1* | 3/2018 | Nilsson | B60W 30/09 |
| 2019/0143972 A1* | 5/2019 | Ishioka | B60W 30/0956 |

OTHER PUBLICATIONS

Article entitled "Lane Change Prediction by Combining Movement and Situation based on Probabilities".

* cited by examiner

CONTROL SYSTEM AND CONTROL METHOD FOR DETERMINING A LIKELIHOOD OF A LANE CHANGE BY A PRECEDING VEHICLE

This application claims priority from German Application No. 10 2016 009 762.0, filed Aug. 11, 2016, the subject matter of which is incorporated herein by reference its entirety.

BACKGROUND OF THE INVENTION

A control system and a control method for determining a likelihood of a lane change by a vehicle traveling in front of a host vehicle is disclosed. This control system and control method are based in particular on a surroundings sensor system in the host motor vehicle, and assist a driver or an autonomously driving motor vehicle. For semiautonomous motor vehicles and autonomously controlled motor vehicles, the control system and a control method increase the safety and the driving comfort of the occupants of the motor vehicle.

PRIOR ART

Present driver assistance systems (advanced driver assistance systems (ADAS)) provide numerous monitoring and information functions in motor vehicles in order to make driving a motor vehicle safer. The surroundings of the motor vehicle are hereby monitored with regard to the travel course of the host motor vehicle, based on surroundings data obtained from one or more surroundings sensors situated on the motor vehicle.

Known driver assistance systems determine, for example, whether the motor vehicle is present within a lane, and whether the driver is unintentionally drifting to one side of the lane or is about to leave the lane. These driver assistance systems generate from the obtained surroundings data a "map" of the roadway and in particular of the lane. In the process, objects such as curbs, lane boundary lines, directional arrows, etc. are recognized and tracked during driving.

Present driver assistance systems also include so-called "blind spot monitors." These monitors determine, for example by means of radar, LIDAR, video, or the like, whether another motor vehicle, a road user, or an object is located to the side of and/or behind the motor vehicle, in which case a lane change or a turn by the host motor vehicle could result in a collision with same.

In addition, automatic speed control of the host motor vehicle is adapted to the speed of a preceding motor vehicle in so-called adaptive cruise control (ACC) systems. The intent is to always maintain a certain distance from the preceding motor vehicle. For this purpose, these types of systems determine a direction of movement and/or a speed of the preceding motor vehicle in order to avoid the host motor vehicle crossing the path of the preceding motor vehicle in such a way that a critical situation arises. This concerns lane change or turning operations on the one hand, and the avoidance of rear-end collisions on the other hand.

A speed controller in a motor vehicle which controls the distance from a preceding motor vehicle, and an emergency braking assistant in a motor vehicle, are driver assistance systems that react to other road users, for example other motor vehicles or pedestrians. For this purpose, the most relevant road user is selected in order to carry out an appropriate action.

This so-called route selection or destination selection frequently takes place by estimating the trajectory of the host motor vehicle and selecting the road user that is present on this trajectory. Estimating the trajectory is generally based on the knowledge of a speed and a yaw rate of the host motor vehicle, as well as other available information such as roadway markers.

In motor vehicles that are driven by persons, the driver assistance systems usually provide an information function in order to warn the driver of a critical situation or an appropriate maneuver, or to suggest to the driver a suitable maneuver for the host motor vehicle. Similarly, the driver assistance systems may also be used in autonomously controlled motor vehicles in order to provide the autonomous control system with the appropriate surroundings data.

Underlying Problem

On roadways having multiple lanes in a travel direction, a lane change by a motor vehicle can have fatal consequences if the lane change by the motor vehicle is incorrectly evaluated, incorrectly recognized, or recognized too late by a vehicle following behind, i.e., by a driver or a driver assistance system of the vehicle following behind. This is particularly true for a lane change by a motor vehicle from a "slower" lane into a "faster" lane (i.e., in continental Europe or the United States, for example, from the right lane into the left lane). In Germany, for example, great differences in speed may exist between a preceding motor vehicle on the "slower" lane and a following motor vehicle on the "faster" lane.

On account of such a speed difference, an incorrect or too-late recognition by the vehicle following behind (the host vehicle) of the lane change by the preceding motor vehicle may have the result that braking or avoidance maneuvers to prevent a rear-end collision are no longer possible. In addition, an incorrect prediction by the vehicle following behind (the host vehicle) of a lane change by the preceding motor vehicle which in fact does not take place may result in unnecessary braking operations and/or driving maneuvers by the following motor vehicle. Such unnecessary braking operations and/or driving maneuvers may also endanger other road users and/or adversely affect driving comfort.

The object, therefore, is to provide a control system and a control method for a motor vehicle that ensure an improved prediction of a lane change by a preceding motor vehicle.

Proposed Solution

This object is achieved by a control system having the features of Claim 1, and a control method having the features of Claim 11.

Preferred embodiments become apparent from subclaims 2 through 10 and 12 through 15, and from the following description.

One aspect relates to a control system that is configured and intended for use in a host motor vehicle. The control system recognizes preceding motor vehicles and preferably stationary objects situated ahead, based on surroundings data obtained from at least one surroundings sensor associated with the host motor vehicle. The at least one surroundings sensor is configured for providing an electronic controller of the control system with surroundings data that represent an area in front of the host motor vehicle. In addition, the control system is at least configured and intended for detecting another motor vehicle, using the road, located in front of the host motor vehicle by means of the at least one surroundings sensor, and determining a lateral movement of the other motor vehicle relative to a lane in which the other motor vehicle or the host motor vehicle is present. Moreover, the control system is at least configured and intended for computing a movement-based likelihood of a lane change by the other motor vehicle, based on the determined lateral movement of the other motor vehicle. Furthermore, the control system is at least configured and intended for determining an instantaneous traffic situation in accordance with the surroundings data obtained by means of the surroundings sensor, and computing a traffic situation-based likelihood of a lane change by the other motor vehicle, based on the determined instantaneous traffic situation. In addition, the control system is at least configured and intended for computing an overall likelihood of a lane change by the other motor vehicle, based on the movement-based likelihood and the traffic situation-based likelihood.

Compared to conventional driver assistance systems, the approach presented here improves a correct assessment and a correct recognition of a lane change by a motor vehicle that is traveling ahead of the host motor vehicle, and that preferably changes from a "slower" lane to a "faster" lane in which the host motor vehicle is present. This improved prediction of a lane change is achieved in particular by the control system combining a movement-based likelihood of a lane change by the other motor vehicle with a traffic situation-based likelihood of a lane change by the other motor vehicle to form an overall likelihood of a lane change by the other motor vehicle, thus reducing the possibility of a misjudgment or a failure to recognize a lane change, in addition, by computing the overall likelihood of a lane change by the other motor vehicle, the control system can assess the movement-based likelihood in accordance with the instantaneous traffic situation.

This allows an increase in driving safety and driving comfort, in that a lane change by another motor vehicle traveling ahead of the host motor vehicle is recognized correctly and in a timely manner, and a speed adaptation and/or a driving maneuver of the host motor vehicle may thus be carried out either by the driver or by a driver assistance system in order to avoid an accident.

In particular, compared to conventional driver assistance systems, a lane change by the other motor vehicle may be recognized earlier by the control system on account of the combined overall likelihood. For example, if the control system computes a high traffic situation-based likelihood of a lane change by the other motor vehicle in accordance with the determined instantaneous traffic situation, by means of the computed overall likelihood an incipient lane change by the other motor vehicle may be recognized, even with a comparatively low movement-based likelihood.

In addition, by means of the control system, in contrast to conventional driver assistance systems, a misjudgment of an unsteady driving behavior of the other motor vehicle as a lane change may be avoided due to computing the combined overall likelihood, if the control system determines, for example, a lateral movement of the other motor vehicle relative to the associated lane in which the other motor vehicle is present, and thus a certain movement-based likelihood of a lane change by the other motor vehicle, while the computed traffic situation-based likelihood of a lane change by the other motor vehicle is very low, the control system may compute an overall likelihood that contradicts an (incipient) lane change by the other motor vehicle.

However, it is understood that the control system can combine or compute the movement-based likelihood and the traffic situation-based likelihood of a lane change by the other motor vehicle to form an overall likelihood in such a way that an exceedance of a limiting value of the movement-based likelihood by the computed movement-based likelihood always results in an overall likelihood that indicates a lane change by the other motor vehicle. It may thus be ensured that even a lane change by the other motor vehicle that contradicts the instantaneous traffic situation is evaluated correctly and recognized in a timely manner by the control system.

According to one refinement, the control system may also be configured and intended for outputting a signal that is suitable for warning a driver of the host motor vehicle of a likely lane change by the other motor vehicle, in accordance with the computed overall likelihood. The control system may thus assist the driver of the host motor vehicle in taking suitable measures as a response to the recognized lane change by the other motor vehicle. Additionally or alternatively, the signal may be suitable for carrying out, in accordance with the computed overall likelihood, an autonomous speed adaptation by the host motor vehicle and/or carrying out an autonomous lane change or an autonomous driving maneuver by the host motor vehicle. The control system may output the signal when the computed overall likelihood exceeds a predetermined threshold value.

In addition, the control system may be configured and intended for ascertaining a host lane in which the host motor vehicle is present, ascertaining an additional lane in which a motor vehicle in the area in front of the host motor vehicle is present, and determining that the motor vehicle in the area in front of the host motor vehicle is the other motor vehicle that is to be detected, when the additional lane is adjacent to the host lane. It may thus be ensured that a motor vehicle using the road and which is present, for example, in the same lane as the host motor vehicle or in some other lane is not determined to be the other motor vehicle that is to be defected, where the other lane is not adjacent to the lane in which the host motor vehicle is present. Furthermore, in particular a lateral movement of the other motor vehicle in the direction of the host lane in which the host motor vehicle is present may thus be determined. In particular, a motor vehicle that is located in front of the host motor vehicle and is the least distance away from the host motor vehicle may be determined as the other motor vehicle by the control system.

The control system may ascertain the host lane and the other lane, for example based on surrounding features such as lane boundaries and/or lane markers. The control system may likewise ascertain these surrounding features based on surroundings date obtained by means of the at least one surroundings sensor. In addition, the control system may also be provided with the surrounding features by an external system, for example a GPS system.

Furthermore, the control system may be configured and intended for detecting, over a predetermined time period or continuously, the other motor vehicle using the road, by means of the at least one surroundings sensor, in order to determine the lateral movement of the other motor vehicle. It is thus possible for the control system to more reliably determine whether an instantaneous lateral movement of the other motor vehicle signifies a lane change, or whether this instantaneous lateral movement of the other motor vehicle is due to the individual driving behavior of the driver of the other motor vehicle. The control system may be trainable, and may take into account the ascertained driving behavior of the other motor vehicle or the driver of the other motor vehicle, for example in computing the movement-based likelihood.

The lateral movement of the other motor vehicle may be determined based on position values and/or lateral speed values.

In particular, the control system may compute the movement-based likelihood using a support vector machine or some other mathematical method For determining the lateral movement of the other motor vehicle, the control system may also be configured and intended for determining, during the predetermined time period or continuously, a change in a distance between a longitudinal axis of the other motor vehicle and a centerline, at least one lane boundary, or at least one lane marker of the associated lane in which the other motor vehicle is present. The centerline and the lane boundary of the associated lane may be a virtual, instantaneous centerline or instantaneous lane boundary of the associated lane that is determined by the control system. Similarly, the control system may determine, during the predetermined time period or continuously, a change in the distance between a longitudinal axis of the other motor vehicle and a virtual or real lane marker or lane boundary on which the host motor vehicle is present.

In one refinement, for determining the instantaneous traffic situation, the control system may be configured and intended for detecting other motor vehicles using the road and/or objects in front of the host motor vehicle, by means of the at least one surroundings sensor. These other motor vehicles and/or objects may be present in an area directly in front of the host motor vehicle as well as in an area at a farther distance away, depending on the surroundings sensor used. It is understood that multiple surroundings sensors may also be used in the control system in order to detect the other motor vehicle, additional motor vehicles, objects, and/or other surrounding features on which the surroundings data are based.

It is understood, however, that the control system may also establish that no additional motor vehicles and/or objects are present in front of the host motor vehicle and thus, in front of the other motor vehicle. In this case, the traffic situation-based likelihood of a lane change by the other motor vehicle may be minimal.

For determining the instantaneous traffic situation, the control system may be configured and intended for determining a distance between the other motor vehicle and an additional motor vehicle or object located in front of the other motor vehicle, as well as a speed difference between the other motor vehicle and the additional motor vehicle or object located in front of the other motor vehicle, wherein the other motor vehicle and the additional motor vehicle or object located in front of the other motor vehicle are present in the same lane. For example, if the determined distance is small while the determined speed difference is large, the control system may compute a high traffic situation-based likelihood of a lane change by the other motor vehicle. On the one hand, for example if the speed difference between the other motor vehicle and the motor vehicle present in front of the other motor vehicle is small, the control system may compute that at that moment there is only a low traffic situation-based likelihood of a lane change by the other motor vehicle.

For determining the instantaneous traffic situation, the control system may be configured and intended for determining a distance between the other motor vehicle and a motor vehicle or object that is offset in front of the other motor vehicle, and for determining a speed difference between the other motor vehicle and the motor vehicle or object that is offset in front of the other motor vehicle, wherein the other motor vehicle and the motor vehicle or object that is offset in front of the other motor vehicle are present in different lanes. For example, the offset motor vehicle or object may be present in the same lane as the host motor vehicle. In particular, the offset motor vehicle or object may be in the lane (target lane) into which the other motor vehicle would presumably move due to the possible lane change. Thus, for example, despite a relatively large speed difference between the other motor vehicle and the additional motor vehicle located in front of the other motor vehicle, the control system can determine a comparatively low traffic situation-based likelihood of a lane change by the other motor vehicle when an offset motor vehicle or object, for example having a speed difference similar to, or situated at a small distance from, the other motor vehicle, is present in the target lane.

For determining the instantaneous traffic situation, the control system may be configured and intended for determining a distance between the other motor vehicle and a motor vehicle that is located behind the other motor vehicle, as well as a speed difference between the other motor vehicle and the motor vehicle located behind the other motor vehicle, wherein the other motor vehicle and the motor vehicle located behind the other motor vehicle are in different lanes. In addition, the motor vehicle located behind the other motor vehicle may in particular be in the target lane or likewise about to make a lane change from the lane of the other motor vehicle into the target lane. Thus, despite a relatively large speed difference between the other motor vehicle and the motor vehicle located in front of the other motor vehicle, the control system can compute a comparatively low traffic situation-based likelihood of a lane change by the other motor vehicle when the motor vehicle located behind the other motor vehicle has, for example, a significantly higher speed and is situated at a small distance from the other motor vehicle.

The determined distances and speed differences between the other motor vehicle, the additional motor vehicle or object located in front of the other motor vehicle, the motor vehicle or object that is offset in front of the other motor vehicle, and/or the motor vehicle located behind the other motor vehicle may be arbitrarily combined by the control system and correlated to one another in order to compute a correct traffic situation-based likelihood of a lane change by the other motor vehicle.

In particular, the control system may compute the traffic situation-based likelihood using a sigmoid function or some other suitable mathematical method.

It is understood that the control system may also be configured and intended for detecting, over a predetermined time period or continuously, the additional motor vehicles using the road by means of the at least one surroundings sensor in order to determine the instantaneous traffic situation. Thus, the control system may also determine, over a predetermined time period or continuously, changes in the above-described relative distances and speed differences. This may likewise be useful in computing the traffic situation-based likelihood of a lane change by the other motor vehicle.

In another embodiment, the control system may be configured and intended for determining whether an additional motor vehicle is present between the other motor vehicle and the host motor vehicle, and determining the host motor vehicle to be the rear motor vehicle when no other motor vehicle is present between the other motor vehicle and the host motor vehicle.

A further aspect relates to a control method, which in a host motor vehicle recognizes preceding motor vehicles and preferably stationary objects situated ahead, based on surroundings data obtained from at least one surroundings sensor associated with the host motor vehicle. The control method is carried out in particular by means of a control system described above. The control method comprises the following steps:

providing the surroundings data for an electronic controller of the control system, the surroundings data representing an area in front of the host motor vehicle, defecting another motor vehicle, using the road, in front of the host motor vehicle by means of the at least one surroundings sensor, determining a lateral movement of the other motor vehicle relative to a lane in which the other motor vehicle or the host motor vehicle is present, computing a movement-based likelihood of a lane change by the other motor vehicle, based on the determined lateral movement of the other motor vehicle, determining an instantaneous traffic situation in accordance with the surroundings data obtained by means of the surroundings sensor, computing a traffic situation-based likelihood of a lane change by the other motor vehicle, based on the determined instantaneous traffic situation, and computing an overall likelihood of a lane change by the other motor vehicle, based on the movement-based likelihood and the traffic situation-based likelihood.

The control method may include the following additional step: outputting a signal in order to warn a driver of the host motor vehicle, in accordance with the computed overall likelihood, of a likely lane change by the other motor vehicle and/or to carry out an autonomous speed adaptation by the host motor vehicle and/or to carry out an autonomous driving maneuver by the host motor vehicle.

The control method may include the following additional steps:

ascertaining a host lane in which the host motor vehicle is present, ascertaining an additional lane in which a motor vehicle in the area in front of the host motor vehicle is present, and determining the motor vehicle in the area in front of the host motor vehicle as the other motor vehicle to be detected, when the additional lane is adjacent to the host lane.

In the control method, in addition the other motor vehicle using the road may be defected over a predetermined time period or continuously by means of the at least one surroundings sensor in order to determine the lateral movement of the other motor vehicle. For determining the lateral movement of the other motor vehicle during the predetermined time period or continuously, a change in a distance between a longitudinal axis of the other motor vehicle and a centerline, at least one lane boundary, or at least one lane marker of the lane in which the other motor vehicle or the host motor vehicle is present may be determined.

The control method may include the following additional step: detecting additional motor vehicles using the road and/or objects located in front of the host motor vehicle by means of the at least one surroundings sensor in order to determine the instantaneous traffic situation.

Furthermore, the control method for determining the instantaneous traffic situation may include one or more of the following additional steps:

determining a distance between the other motor vehicle and an additional motor vehicle or object located in front of the other motor vehicle, and a speed difference between the other motor vehicle and the additional motor vehicle or object located in front of the other motor vehicle, wherein the other motor vehicle and the additional motor vehicle or object located in front of the other motor vehicle are present in the same lane, determining a distance between the other motor vehicle and a motor vehicle or object that is offset in front of the other motor vehicle, and a speed difference between the other motor vehicle and the motor vehicle or object that is offset in front of the other motor vehicle, wherein the other motor vehicle and the motor vehicle or object that is offset in front of the other motor vehicle are present in different lanes, and determining a distance between the other motor vehicle and a motor vehicle located behind the other motor vehicle, and a speed difference between the other motor vehicle and the motor vehicle located behind the other motor vehicle, wherein the other motor vehicle and the motor vehicle located behind the other motor vehicle are present in different lanes, and the motor vehicle located behind the other motor vehicle is preferably the host motor vehicle.

A further aspect relates to a control system that is configured and intended for use in a host motor vehicle. This control system recognizes, based on surroundings data obtained from at least one surroundings sensor associated with the host motor vehicle, roadway boundaries, roadway markers, additional motor vehicles, and/or objects in an area in front of, to the side of, and/or behind the host motor vehicle. The at least one surroundings sensor is configured for providing an electronic controller of the control system with surroundings data that represent the area in front of, to the side of, and/or behind the host motor vehicle. The control system is at least configured and intended for ascertaining an instantaneous driving situation of the host motor vehicle and determining a trajectory for the host motor vehicle that the host motor vehicle is to follow for carrying out a driving maneuver. The control system determines the trajectory in accordance with the ascertained instantaneous driving situation of the host motor vehicle, a desired driving situation of the host motor vehicle, preferably at the end of the trajectory, the driving dynamics of the host motor vehicle, and the surroundings data. The control system is at least configured and intended, essentially simultaneously with determining the trajectory, for generating at least one associated signal that assists a driver of the host motor vehicle in controlling the host motor vehicle in order to follow the trajectory, or at least for generating an associated control command that causes the host motor vehicle to autonomously follow the trajectory.

Compared to conventional driver assistance systems, the approach presented here increases driving safety, since, based on the information concerning roadway boundaries, roadway markers, additional motor vehicles, and/or objects in the area in front of, to the side of, and/or behind the host motor vehicle contained in the surroundings data, the entire surroundings of the host motor vehicle, and thus including the instantaneous traffic situation, are continuously taken into account by the control system in order to determine the trajectory for carrying out the driving maneuver. In other words, the trajectory may be determined as an appropriate response to the instantaneous situation in which the motor vehicle is involved. The surroundings data obtained by means of the at least one surroundings sensor constantly change according to the actual traffic and driving situation.

Moreover, the described control system of the host motor vehicle increases driving comfort by likewise taking into account the driving dynamics of the host motor vehicle in determining the trajectory. In addition, the driving dynamics feasibility of the planned trajectory may be ensured using the control system, which additionally increases driving safety. Furthermore, in other embodiments of the control system the driving behavior of the host motor vehicle may be optimized while following the trajectory by taking the driving dynamics of the host motor vehicle into account. Driving dynamics are understood here to mean, for example, the longitudinal acceleration and the lateral acceleration of the host motor vehicle.

Since the control system of the host motor vehicle generates an appropriate signal for assisting the driver of the motor vehicle, or generates a control command for controlling the motor vehicle, essentially simultaneously with determining the trajectory, it is possible, in contrast to conventional driver assistance systems, to immediately make an appropriate response to the instantaneous traffic and driving situation of the host motor vehicle. The control system thus allows simultaneous planning of the trajectory and control of the driving behavior of the host motor vehicle in the same step. The control system may thus continuously adapt the trajectory, and the driving maneuver by the host motor vehicle based thereon, to the actual traffic and driving situation by continuously determining the trajectory and simultaneously generating the signals/control commands. This applies even when the instantaneous situation in which the host motor vehicle is involved is constantly changing.

The control system may determine the driving dynamics of the host motor vehicle, for example, by means of a nonlinear single-lane model or some other suitable mathematical method.

The control system may also be configured and intended for mapping the desired driving situation of the host motor vehicle at the intended end of the trajectory, the driving dynamics of the host motor vehicle, and the surroundings data in a single vehicle model associated with the host motor vehicle. The control system may determine, based on the single vehicle model, the trajectory for the host motor vehicle and generate the at least one associated signal and/or the at least one associated control command essentially simultaneously. In particular, the control system may likewise generate the at least one associated signal and/or the at least one associated control command by means of the single vehicle model, or derive them from the single vehicle model. Mapping the parameters that are relevant for planning the trajectory and controlling the vehicle behavior in the single vehicle model further improves rapid adaptation of the planning and control to the instantaneous traffic and driving situation of the host motor vehicle and to changes to same. According to one refinement, the control system may be configured and intended for also mapping the determined instantaneous driving situation of the host motor vehicle in the single vehicle model.

The single vehicle model may be included, for example, in the controller of the control system.

In another embodiment, for determining the trajectory, the control system may be configured and intended for creating a surroundings model from the surroundings data. This surroundings model may be a potential field of the surroundings of the host motor vehicle that takes into account at least a portion of the surroundings data obtained by means of the at least one surroundings sensor. An instantaneous traffic density in the area in front of, to the side of, and/or behind the host motor vehicle may be ascertainable by means of the surroundings model. Additionally or alternatively, the type of roadway, a width of the lane and/or of the roadway, and/or a course of the lane and/or of the roadway on which the host motor vehicle is instantaneously present may be ascertainable by means of the surroundings model. The control system, by use of the surroundings model, may make a rough estimate to establish whether the host motor vehicle is instantaneously situated in an urban area, on a national highway, on an expressway, etc. This type of rough estimate, i.e., the result of this rough estimate, may be taken into account by the control system in determining the trajectory and generating the associated signal/control command. If the host motor vehicle is on an expressway, for example, different surroundings data or driving dynamic characteristics may be important for the planning and control than for a residential street, for example. Additionally or alternatively, by means of the surroundings model a traffic density in the area in front of, to the side of, and/or behind the host motor vehicle, and/or an additional motor vehicle and/or object in the area in front of to the side of, and/or behind the host motor vehicle, which makes a driving maneuver by the host motor vehicle necessary may be determinable.

For determining the trajectory, the control system may be configured and intended for comparing the surroundings model, at least in part, to external data, preferably external data of a GPS system, of at least one additional motor vehicle, and/or of a base station. Some of the surroundings data obtained by means of the at least one surroundings sensor may thus be verified, and driving safety may be further increased.

The control system may be configured and intended for determining the trajectory for the host motor vehicle in accordance with adhering to the limits of the driving dynamics of the host motor vehicle while following the trajectory. These limits of the driving dynamics may, for example, be empirically or mathematically determined and stored in a memory of the control system, in addition, the control system may be configured and intended for determining the trajectory for the host motor vehicle in accordance with a reduction in the driving dynamics of the host motor vehicle while following the trajectory. This increases the driving comfort for occupants of the host motor vehicle. In particular, when determining the trajectory the control system may provide for minimization of the driving dynamics of the host motor vehicle, in a manner adequate for the situation, while following the trajectory. Similarly, the control system may also be configured and intended for generating at least one associated signal or the at least one associated control command in accordance with the features described above with regard to the driving dynamics of the host motor vehicle.

By means of the at least one control command, the control system may cause the host motor vehicle to autonomously adapt the acceleration and/or the speed of the host motor vehicle, and/or to autonomously carry out a lateral movement of the host motor vehicle.

For determining the instantaneous driving situation of the host motor vehicle, the control system may also be configured and intended for determining at least one instantaneous position, one instantaneous speed, one instantaneous acceleration, and/or one instantaneous driving dynamic of the host motor vehicle. The control system may determine the instantaneous position, the instantaneous speed, the instantaneous acceleration, and/or the instantaneous driving dynamic of the host motor vehicle by means of the at least one surroundings sensor, additional sensors associated with the host motor vehicle, and/or external systems, for example.

The control system may be configured and intended for determining at least one target position, one target speed, one target acceleration, and/or one target driving dynamic of the host motor vehicle, preferably at the end of the trajectory, in order to determine the desired driving situation of the host motor vehicle. In determining these parameters, the control system may take into account, for example, individual settings by a vehicle occupant and/or the features included by the surroundings model.

A further aspect relates to a control method that in a host motor vehicle recognizes, based on surroundings data obtained from at least one surroundings sensor associated with the host motor vehicle, roadway boundaries, roadway markers, additional motor vehicles, and/or objects in an area in front of, to the side of, and/or behind the host motor vehicle. The control method is carried out in particular by means of a control system described above. The control method comprises the following steps:

ascertaining an instantaneous driving situation of the host motor vehicle,
determining a trajectory for the host motor vehicle that the host motor vehicle is to follow for carrying out a driving maneuver, in accordance with:
the ascertained instantaneous driving situation of the host motor vehicle,
a desired driving situation of the host motor vehicle, preferably at the end of the trajectory,
the driving dynamics of the host motor vehicle, and
the surroundings data.

The control method includes the following additional step, which is carried out essentially simultaneously with determining the trajectory:

generating at least one associated signal that assists a driver of the host motor vehicle in controlling the host motor vehicle in order to follow the trajectory, or
generating at least one associated control command that causes the host motor vehicle to autonomously follow the trajectory.

In particular, in the control method the step of determining the trajectory and the step of generating the at least one associated signal or the at least one associated control command may be carried out in the same step.

The control method may include the following additional step:

mapping the ascertained instantaneous driving situation of the host motor vehicle, the desired driving situation of the host motor vehicle, preferably at the intended end of the trajectory, the driving dynamics of the host motor vehicle, and the surroundings data in a single vehicle model that is associated with the host motor vehicle. Based on the single vehicle model, the trajectory for the host motor vehicle may be determined and the at least one associated signal and/or the at least one associated control command may be generated essentially simultaneously.

In one refinement, the control method may include the following additional step:

generating a surroundings model from the surroundings data for determining the trajectory. Preferably at least one of the following is determined in the control method by means of the surroundings model:

an instantaneous traffic density in the area in front of, to the side of, and/or behind the host motor vehicle,
the type of roadway on which the host motor vehicle is instantaneously present,
a width of the lane and/or roadway on which the host motor vehicle is instantaneously present,
a course of the lane and/or roadway on which the host motor vehicle is instantaneously present,
a traffic density in the area in front of, to the side of, and/or behind the host motor vehicle, and
an additional motor vehicle and/or object in the area in front of, to the side of, and/or behind the host motor vehicle which make(s) a driving maneuver by the host motor vehicle necessary.

In addition, for determining the trajectory, in the control method the surroundings model may be compared, at least in part, to external data, preferably external data of a GPS system, of at least one additional motor vehicle, and/or of a base station.

In the control method, the trajectory for the host motor vehicle may be determined in accordance with adhering to the limits of the driving dynamics of the host motor vehicle while following the trajectory, and reducing or minimizing the driving dynamics of the host motor vehicle while following the trajectory.

The control method may include the following additional step:

by means of the at least one control command, causing the host motor vehicle to autonomously adapt the acceleration and/or the speed of the host motor vehicle and/or to autonomously carry out a lateral movement of the host motor vehicle.

In addition, the control method may include the following additional step:

determining at least one instantaneous position, one instantaneous speed, one instantaneous acceleration, and/or one instantaneous driving dynamic of the host motor vehicle in order to determine the instantaneous driving situation of the host motor vehicle.

Furthermore, the control method may include the following additional step:

determining at feast one target position, one target speed, one target acceleration, and/or one target driving dynamic of the host motor vehicle, preferably at the end of the trajectory, in order to determine the desired driving situation of the host motor vehicle.

It is apparent to those skilled in the art that the aspects and features described above may be arbitrarily combined in a control system and/or a control method. Although some of the above-described features have been explained with reference to a control system, it is understood that these features may also apply to a control method. Likewise, the features described above with reference to a control method may correspondingly apply to a control system.

BRIEF DESCRIPTION OF THE DRAWING

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein. The dimensions and proportions of the components shown in the figures are not to scale.

DETAILED DESCRIPTION OF THE DRAWINGS

Figure 1:
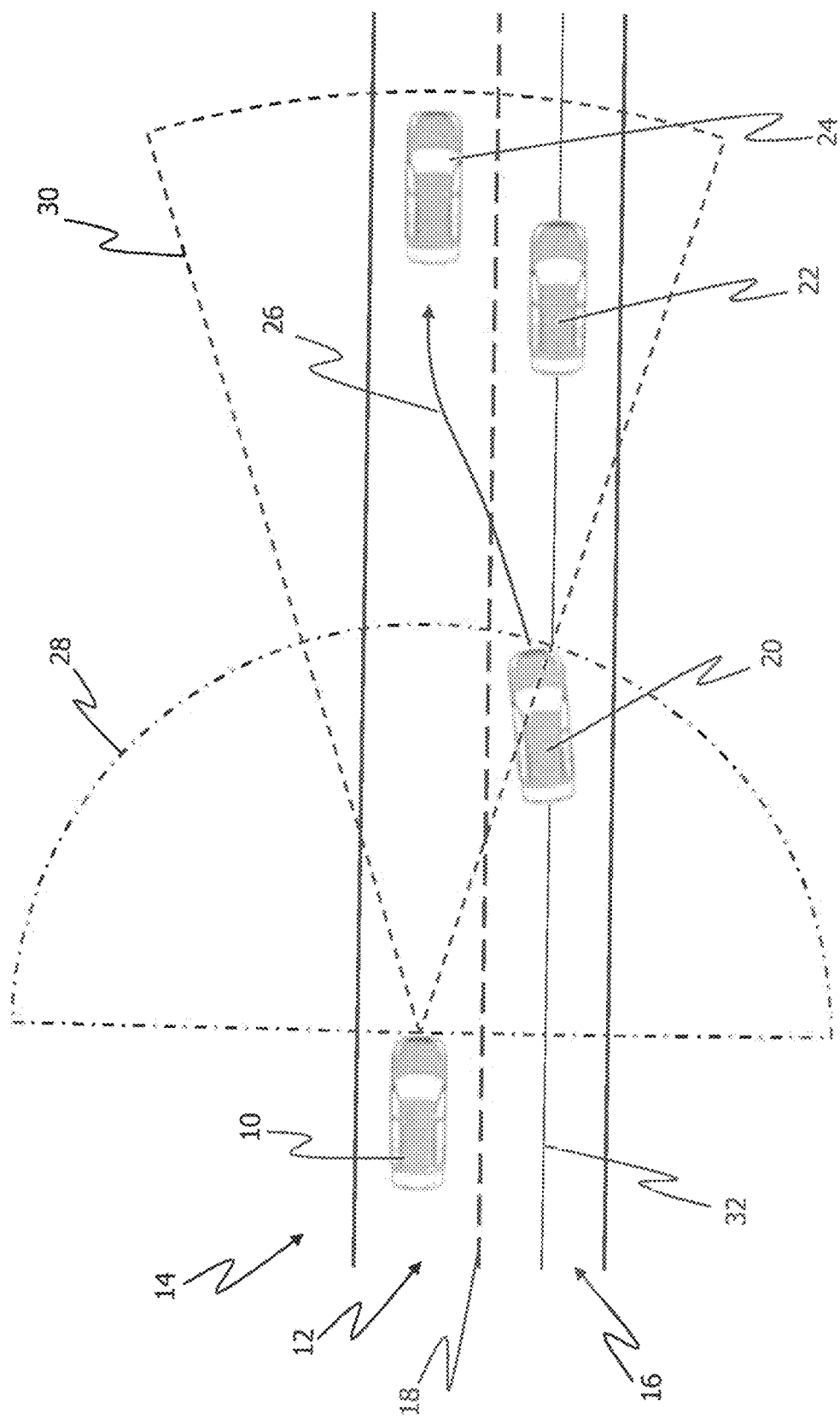
FIG. 1 schematically shows a host motor vehicle, which by means of a first control system detects an area in front of the host motor vehicle in order to compute an overall likelihood of a lane change by another motor vehicle.

FIG. 1 schematically shows a host motor vehicle 10 that is present in a passing lane 12 of a roadway 14. An additional lane 16 of the roadway 14 next to the passing lane 12 is apparent; the passing lane 12 and the additional lane 16 are separated from one another by a dashed-line roadway marker 18.

The host motor vehicle 10 has at least one surroundings sensor (not shown) that is associated with the host motor vehicle 10 and mounted thereon. The surroundings sensor may be designed, for example, in the form of a camera, although use of other known surroundings sensors is also possible. The at least one surroundings sensor is configured for detecting an area in front of the host motor vehicle 10, and providing the surroundings data that represent this area to an electronic controller (not shown) of a control system (not shown) installed in the host motor vehicle 10.

In the example shown in FIG. 1, a first control system detects another motor vehicle 20, which is present in the additional lane 16 adjacent to the passing lane 12, by means of the at least one surroundings sensor. In addition, by means of the at least one surroundings sensor the control system detects an additional motor vehicle 22 that is located in front of the other motor vehicle 20 and likewise present in the additional lane 16, as well as a motor vehicle 24 that is offset in front of the other motor vehicle 20 and present in the passing lane 12.

The motor vehicles 10, 24 traveling in the passing lane 12 each have a higher speed than the motor vehicles 20, 22 traveling in the additional lane 16. In addition, the other motor vehicle 20 is traveling at a speed that is higher than the speed of the additional motor vehicle 22, located in front of the other motor vehicle 20. For this reason, in the situation shown in FIG. 1 the other motor vehicle 20 makes a lane change from the additional lane 16 into the passing lane 12, along the trajectory 26.

To avoid via warning signals and/or automatic driving maneuvers a rear-end collision of the host motor vehicle 10 with the other motor vehicle 20 that is making the lane change, the first control system of the host motor vehicle 10 is configured for recognizing this lane change by the other motor vehicle 20 in a timely manner. For this purpose, the control system of the host motor vehicle 10 computes the likelihood of a lane change by the other motor vehicle 20 in accordance with the surroundings data obtained by means of the at least one surroundings sensor.

As schematically illustrated in FIG. 1, for computing the likelihood of a lane change by the other motor vehicle 20, the control system of the host motor vehicle 10 determines on the one hand a lateral movement of the other motor vehicle 20 relative to the additional lane 16, and on the other hand, an instantaneous traffic situation in the area in front of the host motor vehicle 10. In the illustrated example, the detection of the lateral movement of the other motor vehicle 20 is illustrated by the dash-dotted line 28, while the dashed line 30 illustrates the detection of the instantaneous traffic situation in the area in front of the host motor vehicle 10. However, it is understood that these lines 28, 30 are used merely to illustrate the functional principle of the control system disclosed herein, in which an overall likelihood of a lane change by the other motor vehicle 20 is computed by the control system in accordance with a movement-based likelihood and a traffic situation-based likelihood of a lane change by the other motor vehicle 20. More precisely, the control system computes a movement-based likelihood of a lane change by the other motor vehicle 20 based on the determined lateral movement of the other motor vehicle 20, and computes a traffic situation-based likelihood of a lane change by the other motor vehicle based on the determined instantaneous traffic situation, and combines these computed likelihoods in a suitable manner to form an overall likelihood of a lane change by the other motor vehicle 20. The respective detection of the lateral movement of the other motor vehicle 20 and of the instantaneous traffic situation is not limited to the areas enclosed by the lines 28, 30. Rather, by means of the at least one surroundings sensor the control system detects, for example, an overall area in front of the host motor vehicle 10 and determines from this overall area the lateral movement of the other motor vehicle 20 as well as the instantaneous traffic situation.

For ascertaining the lateral movement of the other motor vehicle 20, in the example shown the control system determines, based on detected roadway markers and/or roadway boundaries, a virtual centerline 32 of the additional lane 16 in which the other motor vehicle 20 is present. The lateral movement of the other motor vehicle 20 is ultimately ascertained via the change in a distance of a vehicle longitudinal axis from the virtual centerline 32 during a predetermined time period. It is understood that the lateral movement of the other motor vehicle 20 is also ascertainable directly via defected roadway markers and/or roadway boundaries without determining a virtual centerline beforehand. The ascertainment of the lateral movement of the other motor vehicle 20 is described in detail with reference to FIG. 2.

In addition, the control system of the host motor vehicle 10 assesses the instantaneous traffic situation in the area in front of the host motor vehicle 10 from the standpoint of the other motor vehicle 20. For this purpose, the control system of the host motor vehicle 10 determines whether a lane change on account of an additional motor vehicle or object in the additional lane 16 in front of the other motor vehicle 20, which is slower than the other motor vehicle 20, is necessary for the other motor vehicle 20, and whether such a lane change is achievable from the other motor vehicle's standpoint, taking into account vehicles and/or objects in the passing lane 12 (target lane) in an area in front of and behind the other motor vehicle 20. The ascertainment of the instantaneous traffic situation is described in detail with reference to FIG. 2.

By computing the overall likelihood in accordance with the computed movement-based likelihood and the computed traffic situation-based likelihood, the control system of the host motor vehicle 10 can recognize a lane change by the other motor vehicle 20 early and correctly evaluate it.

Figure 2:
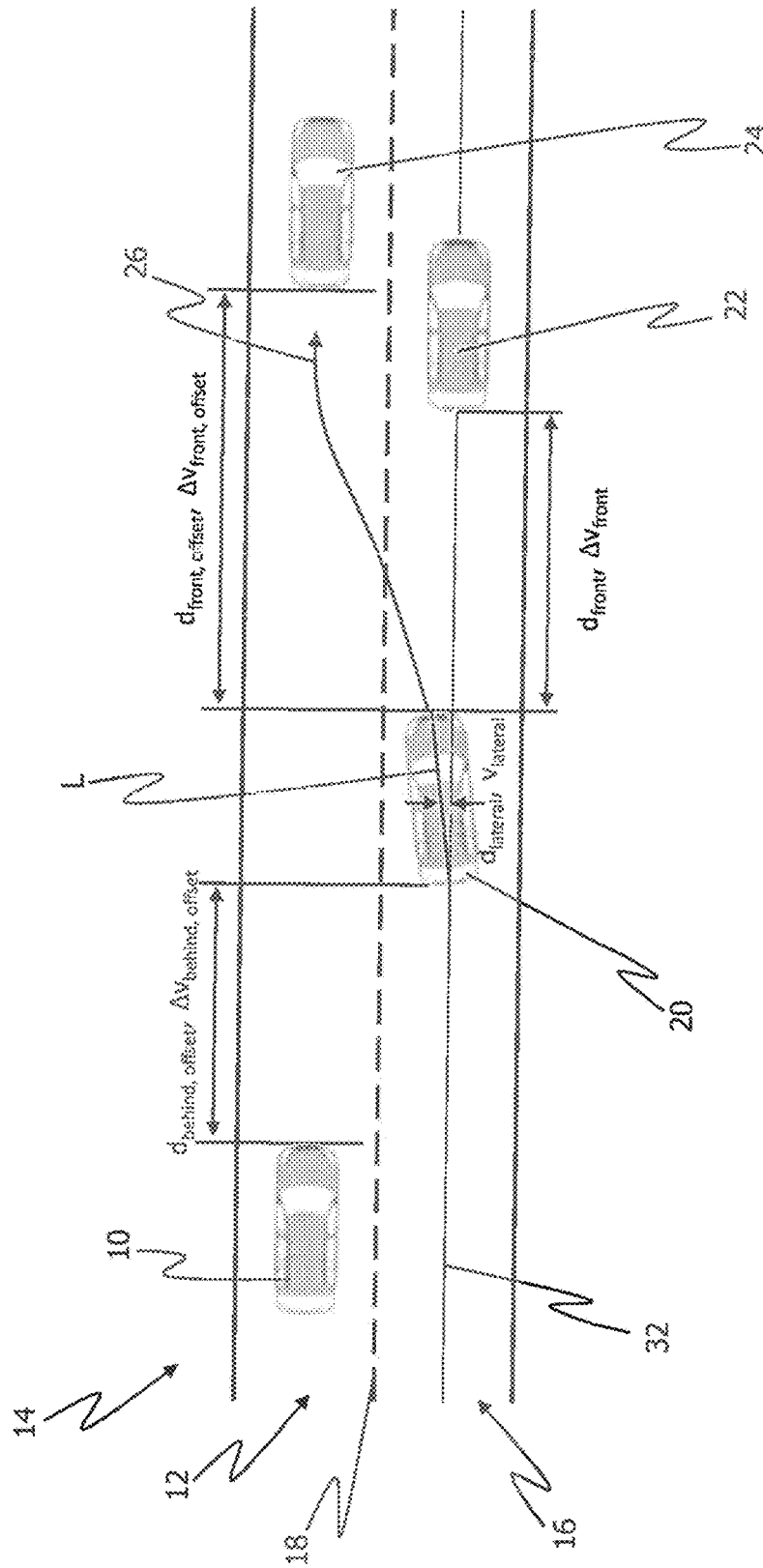
FIG. 2 schematically shows the host motor vehicle, which by means of the first control system determines a lateral movement of the other motor vehicle and an instantaneous traffic situation in the area in front of the host motor vehicle.

FIG. 2 schematically shows how the control system associated with the host motor vehicle 10 determines the lateral movement of the other motor vehicle 20 and the instantaneous traffic situation in the area in front of the host motor vehicle 10 from the standpoint of the other motor vehicle 20.

In the figures discussed below, identical and functionally equivalent features are provided with the same reference numerals as in the figures discussed above.

For determining the lateral movement of the other motor vehicle 20, the control system of the host motor vehicle 10 detects an average lateral distance $d_{lateral}$ of a longitudinal axis L of the other motor vehicle 20 from the virtual centerline 32 of the lane 16, and a lateral speed $v_{lateral}$ of the other motor vehicle 20. The control system of the host motor vehicle 10 defects this average lateral distance $d_{lateral}$ as well as the lateral speed $v_{lateral}$ over a predetermined time period. Based on the change in the average lateral distance $d_{lateral}$ and the lateral speed $v_{lateral}$ over the predetermined time period, the control system ultimately determines the lateral movement of the other motor vehicle 20 relative to the lane 16. On this basis, the control system computes a movement-based likelihood of a lane change by the other motor vehicle 20 by use of a support vector machine. It is understood that other mathematical methods are also possible for computing the movement-based likelihood of a lane change based on the determined lateral movement of the other motor vehicle 20. In addition, the control system may detect the lateral distance and the lateral speed of the other motor vehicle 20 relative to other features, for example roadway or lane markers or roadway or lane boundaries, and on this basis determine the lateral movement of the other motor vehicle 20 without determining a virtual centerline of the lane 16 beforehand. In addition, features of the other motor vehicle 20 other than the longitudinal axis L may be used by the control system as a reference for detecting the lateral distance and/or the lateral speed, such as vehicle body boundaries or certain components of the other motor vehicle 20.

For determining the instantaneous traffic situation, the control system of the host motor vehicle 10 determines a distance $d_{front}$ between the other motor vehicle 20 and the additional motor vehicle 22 located in front of the other motor vehicle 20, as well as a speed difference $\Delta v_{front}$ between the two vehicles. The other motor vehicle 20 and the additional motor vehicle 22 located in front of the other motor vehicle 20 are present in the same lane 16, which is adjacent to the passing lane 12 in which the host motor vehicle 10 is present. At the same time, the control system of the host motor vehicle 10 determines a distance $d_{front,offset}$ as well as a speed difference $\Delta v_{front,offset}$ between the other motor vehicle 20 and the motor vehicle 24 that is offset in front of the other motor vehicle 20. The offset motor vehicle 24 is in the passing lane 12 that is adjacent to the additional lane 16 in which the other motor vehicle 20 is present, whereby the lane of the offset motor vehicle 24 represents the target lane for a lane change by the other motor vehicle 20. Likewise at the same time, the control system of the host motor vehicle 10 determines a distance $d_{behind,offset}$ and a speed difference $\Delta v_{behind,offset}$ between the other motor vehicle 20 and the host motor vehicle 10 that is behind the other motor vehicle, which is present in the passing lane 12, and thus, the target lane for a lane change by the other motor vehicle 20.

The above discussion shows that the control system of the host motor vehicle 10 determines the instantaneous traffic situation from the standpoint of the other motor vehicle 20, which in the case of making a lane change represents a potential hazard for the host motor vehicle 10. Based on this determined instantaneous traffic situation in the surroundings of the other motor vehicle 20 and in front of the host motor vehicle 10, the control system of the host motor vehicle 10 can compute the traffic situation-based likelihood of a lane change by the other motor vehicle 20. The control system of the host motor vehicle 10 is thus already able, at an early point in time, to recognize a likely lane change by the other motor vehicle 20 and to take appropriate measures or prepare for appropriate measures, even if a driver of the other motor vehicle 20 initiates this lane change comparatively late. In addition, the movement-based likelihood of a lane change, computed at the same time by the control system of the host motor vehicle 10 in accordance with the determined lateral movement of the other motor vehicle 20, may be assessed taking into account the determined instantaneous traffic situation and the traffic situation-based likelihood. Thus, the control system may interpret, for example, even a small lateral movement of the other motor vehicle 20, with a very high traffic situation-based likelihood of a lane change, as an initiation of a lane change by the driver of the other motor vehicle 20, which is expressed in the computed overall likelihood.

Figure 3:
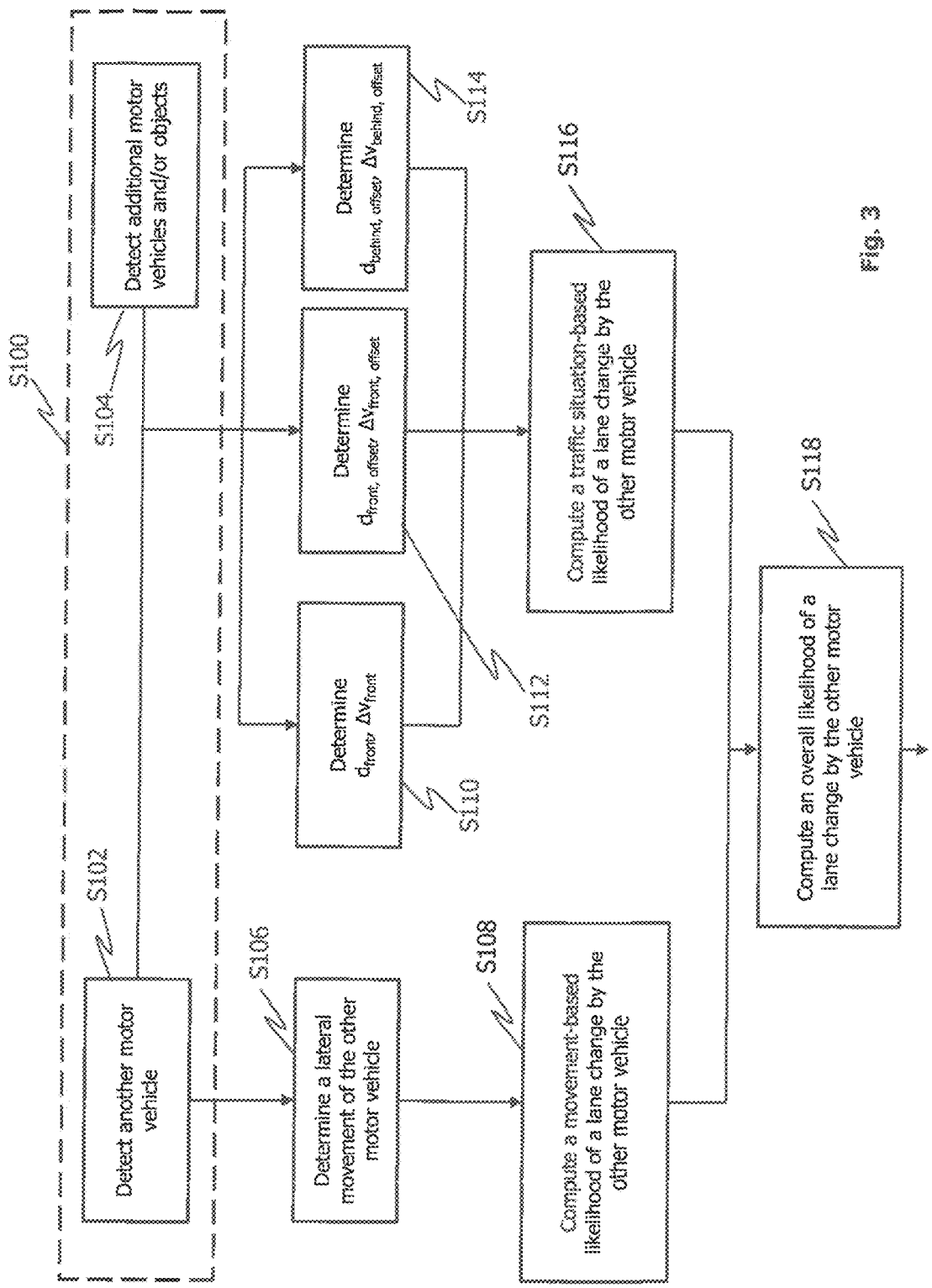
FIG. 3 shows a schematic illustration of a flow chart for explaining the first control system, which is suitable for use in the host motor vehicle and is configured and intended for computing an overall likelihood of a lane change by another motor vehicle.

FIG. 3 shows a schematic illustration of a flow chart for explaining the control system, which is suitable for use in the host motor vehicle (not shown in FIG. 3) and configured and intended for computing an overall likelihood of a lane change by another motor vehicle (not shown in FIG. 3). In step S100, the control system of the host motor vehicle detects by means of a surroundings sensor the area in front of the host motor vehicle or preceding motor vehicles and stationary objects situated ahead in this area. More precisely, in step S100 the control system detects the other motor vehicle S102 as well as additional motor vehicles and/or objects S104 in the area in front of the host motor vehicle. Step S100 is explained in greater detail with reference to FIG. 5.

In step S106, the control system determines a lateral movement of the other motor vehicle relative to the associated lane in which the other motor vehicle is present. For this purpose, the control system, for example during a predetermined time period or continuously, determines a change in a distance of the other motor vehicle from a real or virtual lane marker and/or lane boundary of the lane in which the other motor vehicle is present. It is understood that the control system may also determine a lateral movement of the other motor vehicle relative to a target lane in which the host motor vehicle, for example, is present. At the same time, this also represents a determination of a relative lateral movement of the other motor vehicle with respect to the lane in which the other motor vehicle is present.

Based on the lateral movement of the other motor vehicle determined in step S106, the control system of the host motor vehicle computes a movement-based likelihood of a lane change by the other motor vehicle in step S108.

Essentially in parallel with the operation described above, in step S110 the control system determines a distance as well as a speed difference between the other motor vehicle and an additional motor vehicle or object located in front of the other motor vehicle, whereby the other motor vehicle and the additional motor vehicle or object are in the same lane. In step S112, the control system of the host motor vehicle also determines a distance as well as a speed difference between the other motor vehicle and a motor vehicle or object offset in front of the other motor vehicle, whereby the other motor vehicle and the motor vehicle or object offset in front of the other motor vehicle are in adjacent lanes. In addition, in step S114 the control system determines a distance as well as a speed difference between the other motor vehicle and the host motor vehicle located behind the other motor vehicle, whereby the host motor vehicle and the other motor vehicle are in different lanes.

By use of the relationships determined in steps S110, S112, and S114, the control system determines an instantaneous traffic situation in accordance with the surroundings data obtained by means of the surroundings sensor, from the standpoint of the other motor vehicle.

Based on this determined instantaneous traffic situation, in step S116 the control system of the host motor vehicle computes a traffic situation-based likelihood of a lane change by the other motor vehicle.

Lastly, in step S118 the control system of the host motor vehicle computes an overall likelihood of a lane change by the other motor vehicle in accordance with the previously computed movement-based likelihood and traffic situation-based likelihood.

Figure 4:
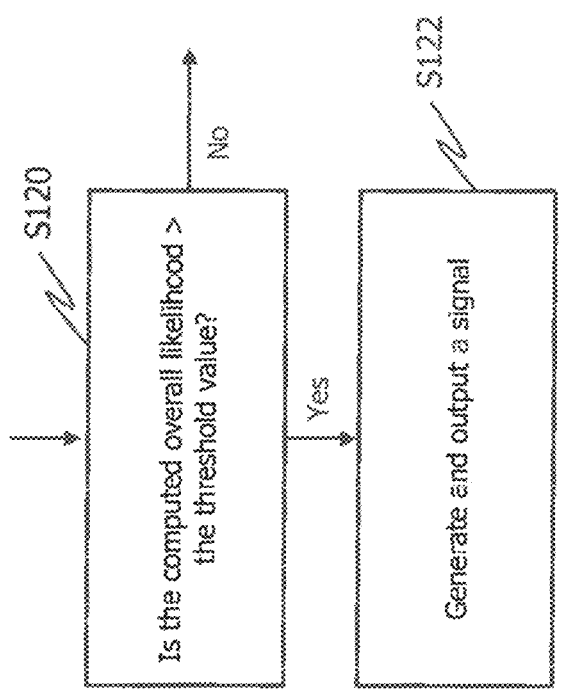
FIG. 4 shows a schematic illustration of a further flow chart for explaining the first control system.

FIG. 4 shows a schematic illustration of a further flow chart for explaining the control system; the illustrated additional flow chart is a continuation of the flow chart shown in FIG. 3. In step S120 shown in FIG. 4, the overall likelihood previously computed in step S118 is compared to a predetermined threshold value that indicates a likely lane change by the other motor vehicle. This threshold value may be predetermined based on empirical values, for example, and stored in a memory of the control system. If the control system determines in step S120 that the computed overall likelihood exceeds the predetermined threshold value (Yes), the control system generates a signal in step S122 in order to warn a driver of the host motor vehicle of a likely lane change by the other motor vehicle and/or to carry out an autonomous speed adaptation by the host motor vehicle and/or to carry out an autonomous driving maneuver by the host motor vehicle. On the one hand, if the control system determines in step S120 that the computed overall likelihood does not exceed the predetermined threshold value (No), the control system begins anew with step S100. It is noted that the control system may also begin anew with step S100 after carrying out step S122 in order to also determine whether the other motor vehicle is making a lane change.

Figure 5:
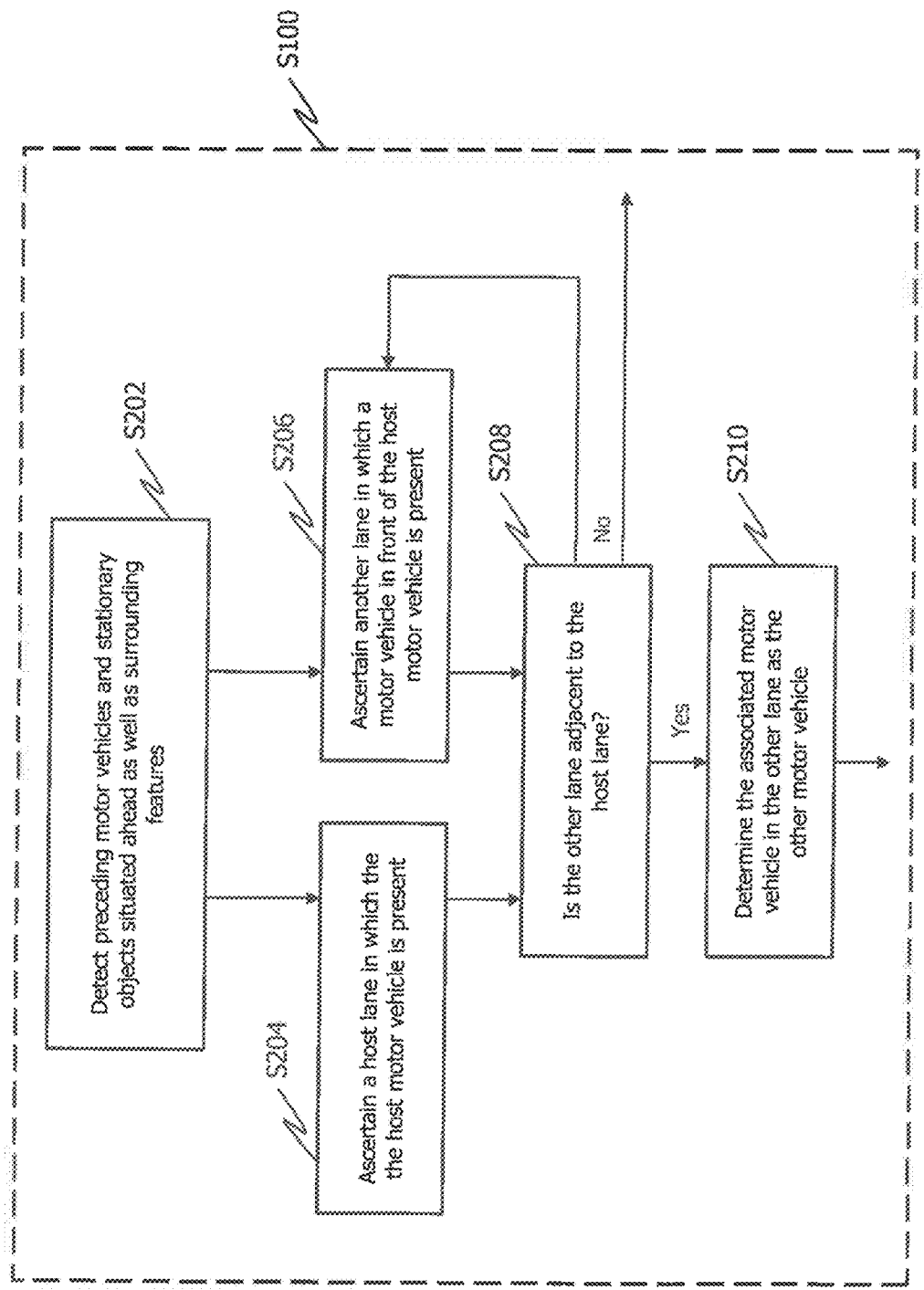
FIG. 5 shows a schematic illustration of a further flow chart for explaining step S100 shown in FIG. 3.

FIG. 5 shows a schematic illustration of a further flow chart for explaining step S100 shown in FIG. 3. As described above, in step S100 the control system of the host motor vehicle detects by means of a surroundings sensor the other motor vehicle S102 as well as additional motor vehicles and/or objects S104 in the area in front of the host motor vehicle. However, to distinguish between the other motor vehicle and the additional motor vehicles/objects, in another embodiment the control system may first carry out step S202, in which the control system recognizes preceding motor vehicles and objects traveling ahead, as well as surrounding features in the area in front of the host motor vehicle, without making distinctions between the other motor vehicle and additional motor vehicles/objects.

In step S204, the control system of the host motor vehicle subsequently determines a host lane in which the host motor vehicle is present, based on the surrounding features such as lane markers or lane boundaries. At the same time, in step S208 the control system determines, based on the surrounding features, an additional lane in which one of the motor vehicles in front of the host motor vehicle is present. More precisely, in this step the control system determines the lane in which the motor vehicle that is the closest distance from the host motor vehicle is present.

The control system of the host motor vehicle determines in step S208 whether the ascertained additional lane is adjacent to the ascertained host lane. If this is not the case (No), the control system returns to step S206 and carries out this step anew, but this time using another detected motor vehicle that is the next closest distance from the host motor vehicle. Alternatively, the control system terminates the control method when no additional motor vehicles have been detected, and begins anew with step S100 as soon as additional motor vehicles and/or objects are detected by means of the surroundings sensor.

However, if the control system of the host motor vehicle determines in step S208 that the ascertained additional lane is adjacent to the ascertained host lane (Yes), the control system skips to step S210 and determines the associated motor vehicle in the additional lane as the other motor vehicle, and continues with the steps shown in FIG. 3.

Figure 6:
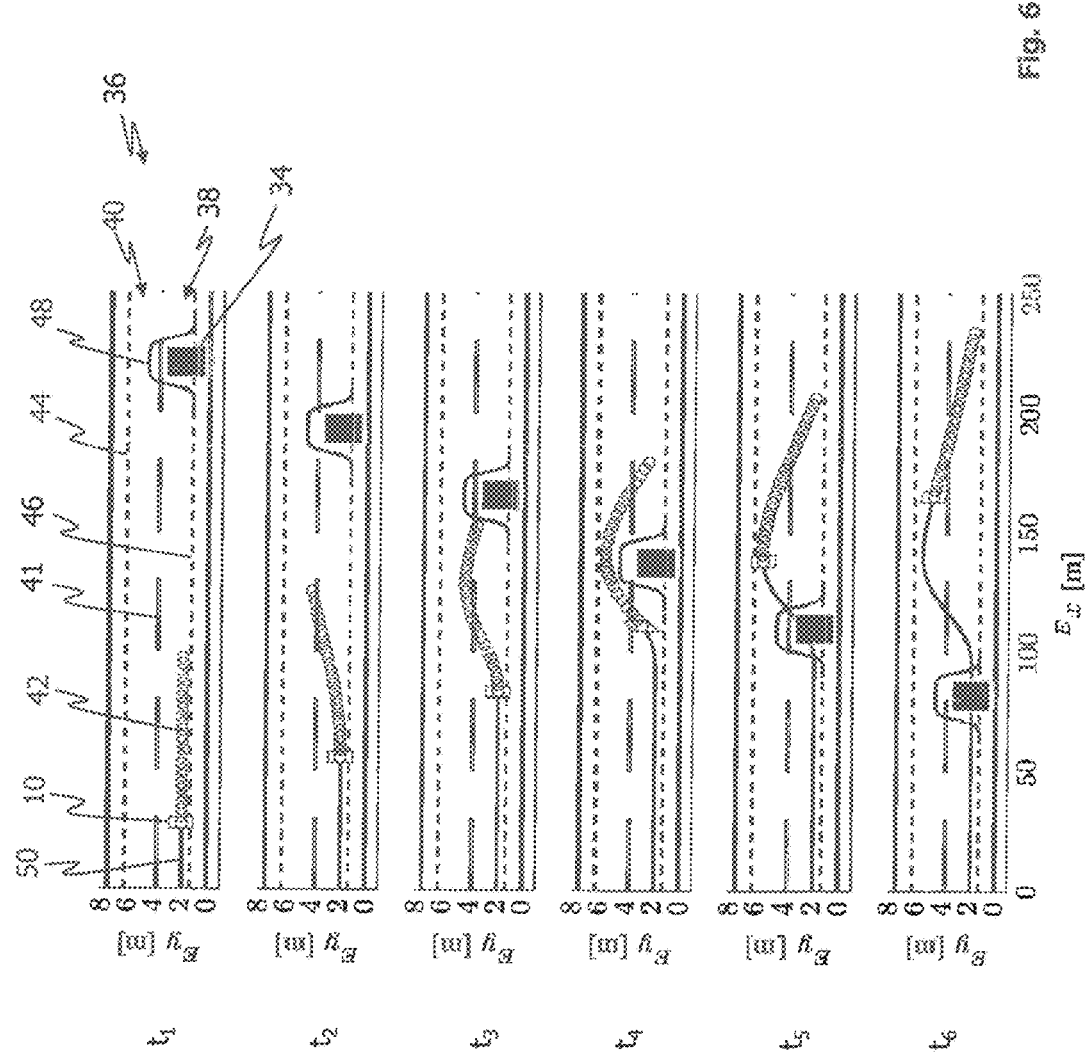
FIG. 6 schematically shows the host motor vehicle which, by means of a second control system that plans a trajectory and generates associated control commands, drives around an obstacle.

FIG. 6 schematically shows the host motor vehicle 10, which is driving around an obstacle 34 with the aid of a second control system. More precisely, FIG. 6 shows the driving maneuver carried out by the host motor vehicle 10 in order to drive around the obstacle 34, at six different points in time $t_1$ through $t_6$. The host motor vehicle 10 and the obstacle 34 are illustrated in a highly simplified manner in FIG. 6 for reasons of clarity. In addition, the reference numerals in FIG. 6 are illustrated only in the situation at point in time $t_1$ for reasons of clarity. However, the reference numerals correspondingly apply for the situations shown at points in time $t_2$ through $t_6$. The obstacle 34 may in particular be a motor vehicle that is traveling in front of the host motor vehicle 10. As is apparent from FIG. 6, not only the host motor vehicle 10, but also the obstacle 34 is moving in the example shown.

FIG. 6 shows a roadway 36 having a lane 38 in which both the host motor vehicle 10 and the obstacle 34 are present, and an oncoming lane 40. The lane 38 and the oncoming lane 40 are separated from one another by a dashed centerline 41. This means that a passing operation is basically allowed on the roadway 36 shown. It is understood that the discussion above and presented below similarly applies for a roadway having multiple lanes in the same travel direction, in which the host motor vehicle and an obstacle to be driven around are present.

Also illustrated in FIG. 6 is a trajectory 42, determined by the second control system of the host motor vehicle 10, which the host motor vehicle 10 is to follow for carrying out a driving maneuver. Similarly as for the position of the host motor vehicle 10 and of the obstacle 34, between the shown points in time $t_1$ through $t_6$ the trajectory 42 determined by the second control system also changes in accordance with the ascertained instantaneous driving situations of the host motor vehicle 10, the desired driving situation of the host motor vehicle 10, the driving dynamics of the host motor vehicle 10, and the surroundings data that have been detected by means of at least one surroundings sensor of the host motor vehicle 10. In other words, the second control system of the host motor vehicle 10 continuously determines a trajectory 42 at the instantaneous point in time, and the trajectory is adapted to the instantaneous driving and traffic situation of the host motor vehicle 10.

Based on the parameters described above that influence the trajectory determination, the second control system derives limits for the trajectory to be determined, which are indicated in visual form in FIG. 6 by way of example. Thus, dashed lines 44, 46 on the roadway boundary form assigned limits that must not be exceeded by the trajectory 42, i.e., by the host motor vehicle 10 following the trajectory 42, in order to ensure driving safety. Correspondingly, line 48 forms a limit that is assigned to the obstacle 34, which likewise must not be exceeded by the trajectory 42, i.e., by the host motor vehicle 10 following the trajectory 42, when driving around the obstacle 34.

Concurrently with the determination of the trajectory 42, the second control system of the host motor vehicle generates associated signals that assist the driver of the host motor vehicle 10 in controlling the host motor vehicle 10 in order to follow the trajectory 42, or generates associated control commands that cause the host motor vehicle 10 to autonomously follow the trajectory 42. This following of the trajectory 42 is illustrated in FIG. 6 by the position of the host motor vehicle 10, which changes between points in time $t_1$ through $t_6$, and the resulting movement pattern 50. As is apparent in particular from the situation shown at point in time $t_6$, the movement pattern 50 of the host motor vehicle 10 at the end of the driving maneuver does not correspond to a mere addition of all trajectories 42 previously determined by the second control system. The reason is that in the course of the driving maneuver, these trajectories 42 are continuously adapted to the changing instantaneous situation of the host motor vehicle 10 and of the surroundings, and the host motor vehicle 10 always follows only a segment of each trajectory 42.

Figure 7:
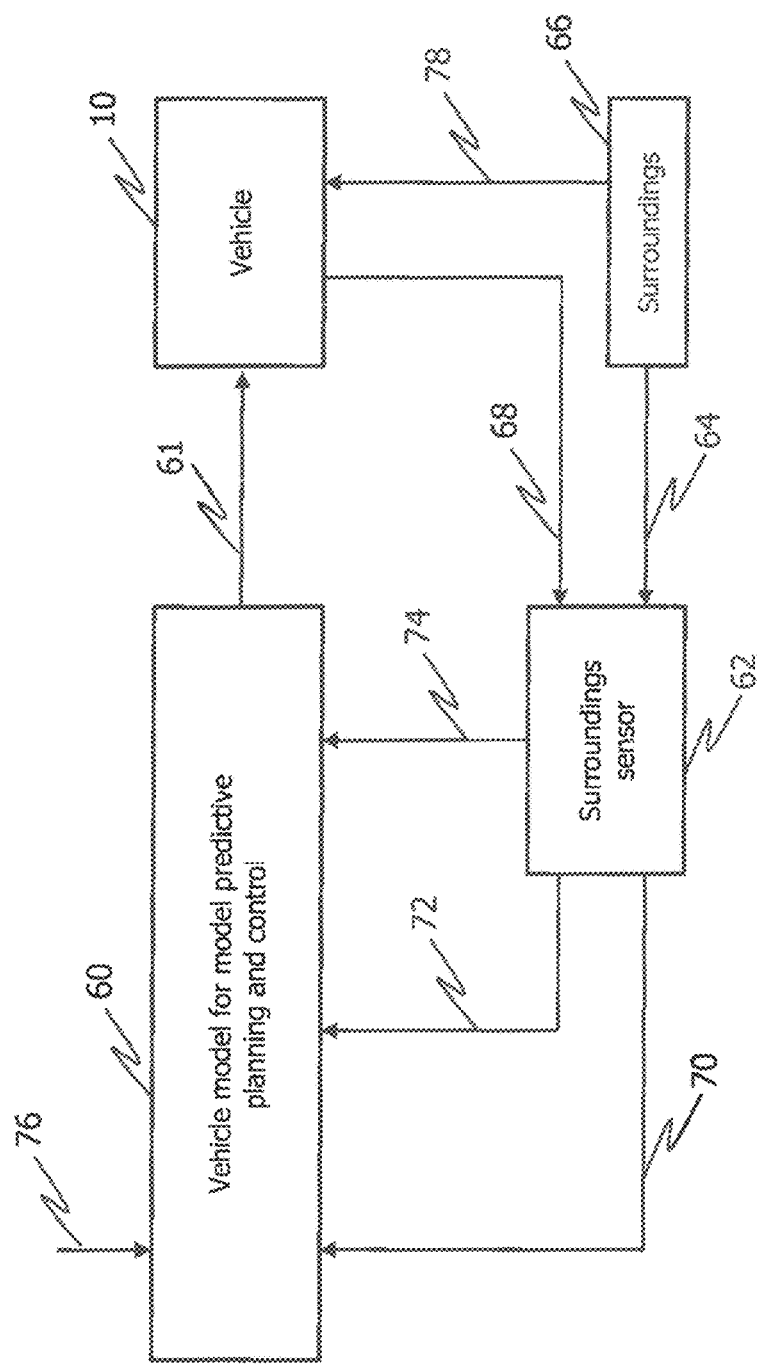
FIG. 7 shows a schematic illustration of a diagram for explaining the second control system, which is suitable for use in the host motor vehicle and is configured and intended for simultaneously planning a trajectory and generating associated signals or control commands.

FIG. 7 shows a schematic illustration of a diagram for explaining the second control system of the host motor vehicle 10. This second control system comprises a single vehicle model 60, on the basis of which the trajectory (not shown here) is determined essentially simultaneously and in the same step, and associated signals 61 or control commands 61 are generated. In the exemplary embodiment shown, the single vehicle model 60 is implemented in the controller of the control system. The single vehicle model 60 determines/generates the trajectory and the associated signals or control commands in accordance with various parameters.

For this purpose, the at least one surroundings sensor 62 associated with the host motor vehicle 10 detects surroundings data 64 of the surroundings 66 as well as vehicle-specific data 68 of the host motor vehicle 10. The surroundings data 64 may include, for example, information concerning roadway boundaries, roadway markers, roadway condition, additional motor vehicles, objects, etc., in the area in front of, to the side of, and/or behind the host motor vehicle 10. The surroundings data thus represent the instantaneous situation in which the host motor vehicle 10 is present. The vehicle-specific data 68 concern, for example, the driving dynamics, the instantaneous speed, the instantaneous position, etc., of the host motor vehicle 10.

The surroundings sensor 62 relays the detected surroundings data 64 and vehicle-specific data 68 in various forms to the single vehicle model 60. For example, in the embodiment shown here, data 70 concerning a movement and/or position of an obstacle traveling ahead, data 72 concerning the instantaneous position of the host motor vehicle 10, and data 74 concerning the instantaneous speed of the host motor vehicle 10 are relayed from the at least one surroundings sensor 62 to the single vehicle model 60, and are mapped and further processed therein in order to determine the trajectory and generate the associated signals/control commands. In addition, an external source (not shown) relays data 76 concerning a desired driving situation of the host motor vehicle 10, for example at the end of the trajectory, to the single vehicle model 60.

It is understood that the data transmissions shown in FIG. 7 are strictly by way of example and are not exhaustive. Rather, other parameters that are relevant for determining the trajectory and generating signals/control commands may be detected by the at least one surroundings sensor 62 and transmitted by same and/or by external sources to the second control system, which is the single vehicle model 60 of the control system.

The surroundings 66 in which the host motor vehicle 10 is instantaneously present may have effects on the host motor vehicle 10, as indicated by the arrow 78. These effects may likewise be important for determining the trajectory, in that the parameters described above are taken into account by the second control system or by use of the single vehicle model 60.

Figure 8:
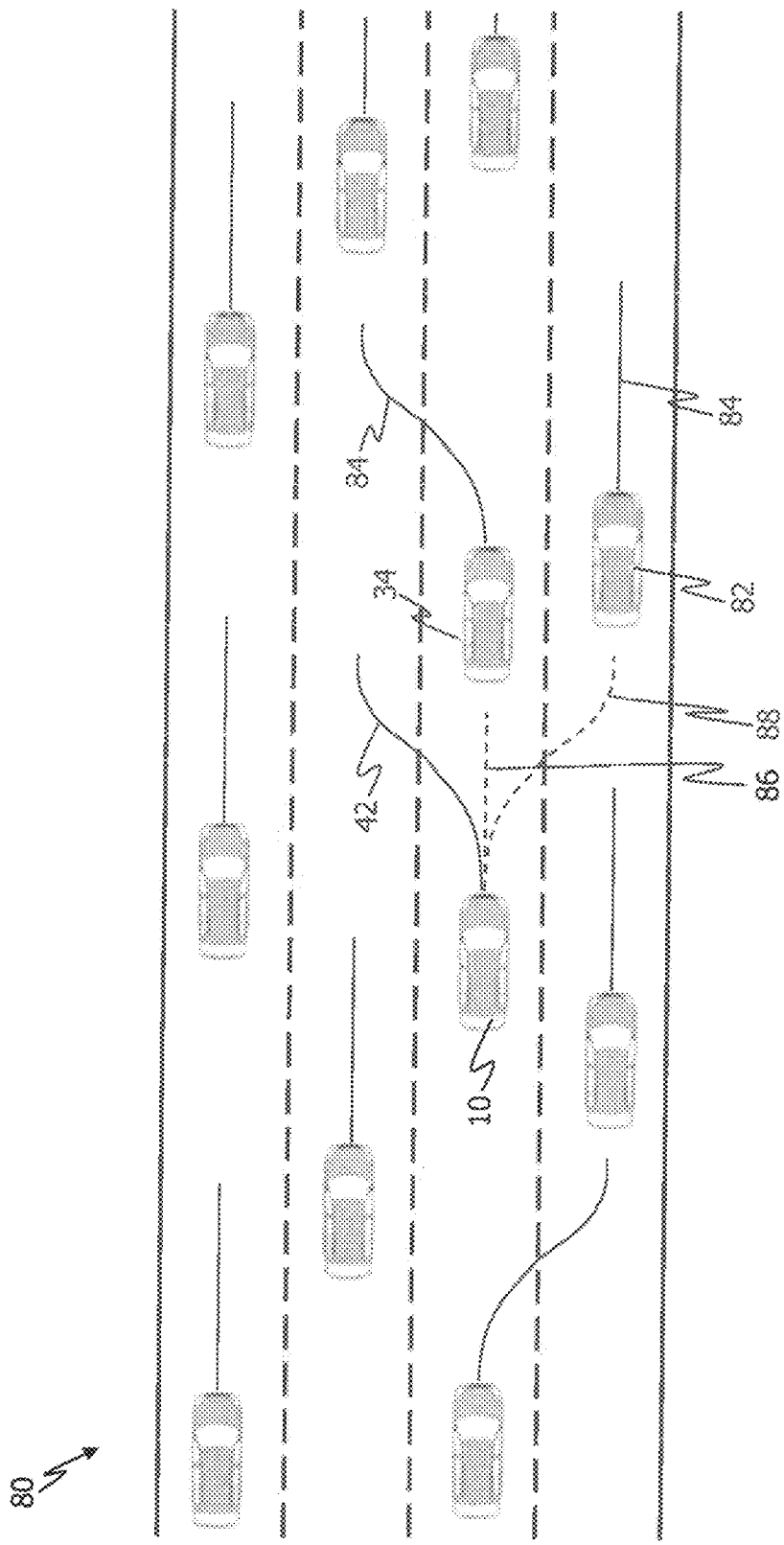
FIG. 8 schematically shows the host motor vehicle, which includes the second control system, in an instantaneous traffic environment.

FIG. 8 schematically shows the host motor vehicle 10, which includes the second control system. In the example shown, the host motor vehicle 10 is in an instantaneous traffic situation on a multilane roadway 80, with a plurality of additional motor vehicles 62 present in an area in front of, to the side of, and behind the host motor vehicle 10. These additional motor vehicles 82 each follow an associated trajectory 84. For reasons of clarity, only one of the plurality of additional motor vehicles 82 is provided with a reference numeral.

To avoid an obstacle 34 traveling ahead of the host motor vehicle 10, in the present case a slower-moving motor vehicle 34, the second control system of the host motor vehicle determines the trajectory 42 based on a surroundings model generated from the surroundings data. This surroundings model represents a potential field of the instantaneous surroundings of the host motor vehicle 10, and allows the control system to ensure that a driving maneuver initiated by the signals/control commends associated with the trajectory is achievable and safe with regard to the instantaneous surroundings (roadway characteristics, traffic situation, etc.). The second control system of the host motor vehicle 10 hereby rejects planning of the trajectories 86, 88, for example, since following these trajectories 86, 88 would not be possible due to the instantaneous traffic situation. The second control system may additionally compare this surroundings model to external GFS data and traffic and roadway information. By generating such a surroundings model, the second control system of the host motor vehicle 10 can appropriately respond to practically any instantaneous traffic situation.

Figure 9:
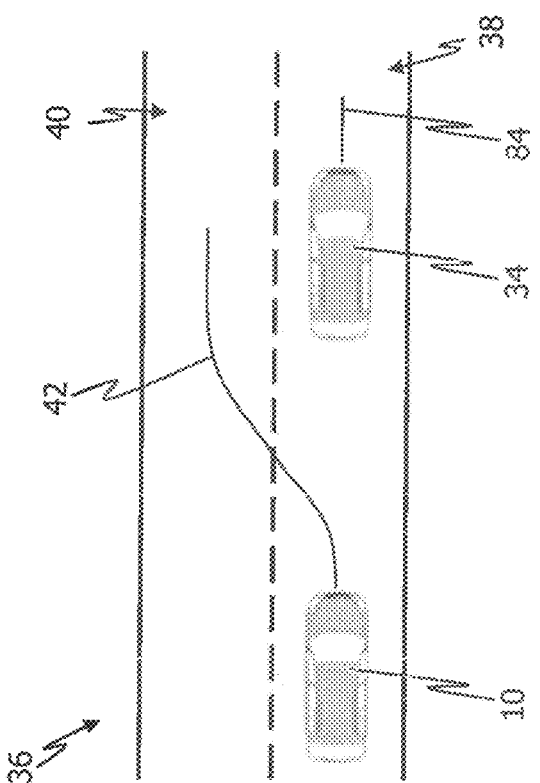
FIG. 9 schematically shows the host motor vehicle, which includes the second control system, which generates a trajectory and associated signals or control commands for passing a preceding motor vehicle.

FIG. 9 schematically shows the host motor vehicle 10, which includes the second control system. In the illustrated example, the second control system determines the trajectory 42 and generates associated signals or control commands in order to assist the host motor vehicle 10 or to prompt passing of a preceding obstacle 34 in the form of a motor vehicle that is traveling more slowly. For this purpose, the control system determines, based on the surroundings data obtained by means of the at least one surroundings sensor (not shown), that no oncoming motor vehicle or obstacle is present in the oncoming lane 40. In addition, the control system here also determines that the entire roadway 36 is suitable for a passing maneuver with regard to other features, for example the width and course of the roadway. The control system then determines the appropriately adapted trajectory 42 for safely passing the obstacle 34, and generates the associated signals/control commands for following this trajectory 42.

Figure 10:
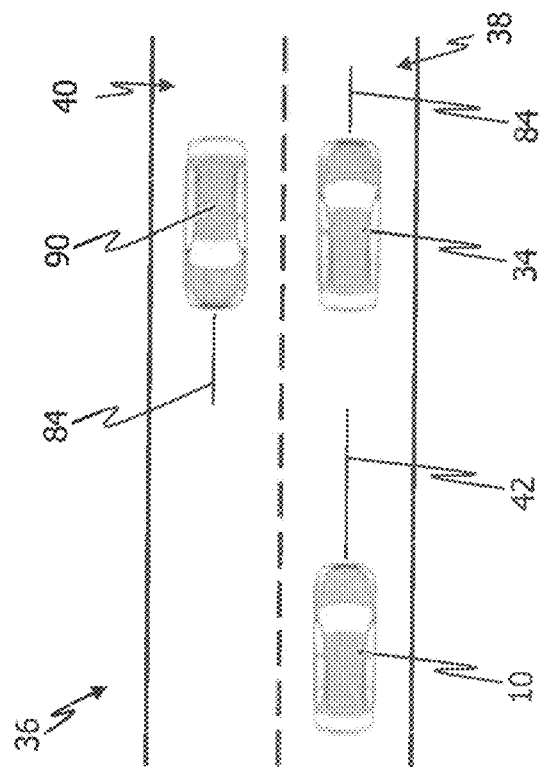
FIG. 10 schematically shows the host motor vehicle, which includes the second control system, which generates a trajectory and associated signals or control commands in order to not carry out a passing operation.

In contrast to the example shown in FIG. 9, the second control system in FIG. 10 identifies an oncoming motor vehicle 90 in the oncoming lane 40. Since a passing operation by the host motor vehicle 10 would not be safe in the instantaneous situation due to this oncoming motor vehicle 90, in this example the control system determines a trajectory 42 that does not provide for a passing operation by the host motor vehicle 10.

It is understood that the exemplary embodiments explained above are not exhaustive, and do not limit the subject matter disclosed herein. In particular, if is apparent to those skilled in the art that they may combine the features of the various embodiments with one another and/or omit various features of the embodiments without thereby departing from the subject matter disclosed herein.

The invention claimed is:

1. A control system which for use in a host motor vehicle (10) is configured and intended for recognizing, based on surroundings data obtained from at least one surroundings sensor associated with the host motor vehicle (10), preceding motor vehicles and preferably stationary objects situated ahead, wherein the at least one surroundings sensor is configured for providing an electronic controller of the control system with surroundings data that represent an area in front of the host motor vehicle (10), and the control system is at least configured and intended for detecting (S100) another motor vehicle (20), using the road, located in front of the host motor vehicle (10) by means of the at least one surroundings sensor,
   determining (S106) a lateral movement of the other motor vehicle (20) relative to a lane (12, 16) in which the other motor vehicle (20) or the host motor vehicle (10) is present,
   computing (S108) a movement-based likelihood of a lane change by the other motor vehicle (20), based on the determined lateral movement of the other motor vehicle (20),
   determining (S110, S112, S114) an instantaneous traffic situation in accordance with the surroundings data obtained by means of the surroundings sensor,
   computing (S116) a traffic situation-based likelihood of a lane change by the other motor vehicle (20), based on the determined instantaneous traffic situation,
   computing (S118) an overall likelihood of a lane change by the other motor vehicle (20), based on the movement-based likelihood and the traffic situation-based likelihood,
   ascertaining (S204) a host lane (12) in which the host motor vehicle (10) is present,
   ascertaining (S206) an additional lane (16) in which a motor vehicle in the area in front of the host motor vehicle (10) is present,
   determining (S210) that the motor vehicle in the area in front of the host motor vehicle (10) is the other motor vehicle (20) that is to be detected, when the additional lane (16) is adjacent to the host lane (12),
   detecting, over a predetermined time period or continuously, the other motor vehicle (20) using the road, by means of the at least one surroundings sensor, in order to determine the lateral movement of the other motor vehicle (20), which for determining the lateral movement of the other motor vehicle (20) is further configured and intended for
   determining, during the predetermined time period or continuously, a change in a distance ($d_{lateral}$) between a longitudinal axis (L) of the other motor vehicle (20) and a centerline (18), at least one lane boundary, or at least one lane marker of the lane in which the other motor vehicle (20) or the host motor vehicle (10) is present, which for determining the instantaneous traffic situation is further configured and intended for
   detecting other motor vehicles (22, 24) using the road and/or objects in front of the host motor vehicle (10), by means of the at least one surroundings sensor, and
   determining (S110) a distance ($d_{front}$) between the other motor vehicle (20) and an additional motor vehicle (22) or object located in front of the other motor vehicle, as well as a speed difference ($\Delta v_{front}$) between the other motor vehicle (20) and the additional motor vehicle (22) or object located in front of the other motor vehicle, wherein the other motor vehicle (20) and the additional motor vehicle (22) or object located in front of the other motor vehicle are present in the same lane.

2. The control system according to claim 1, which is further configured and intended for outputting (S122) a signal that in accordance with the computed overall likelihood is suitable for
   warning a driver of the host motor vehicle (10) of a likely lane change by the other motor vehicle (20) and/or
   carrying out an autonomous speed adaptation by the host motor vehicle (10) and/or
   carrying out an autonomous driving maneuver by the host motor vehicle (10).

3. The control system according to claim 1, which for determining the instantaneous traffic situation is further configured and intended for determining a distance ($d_{front, offset}$) between the other motor vehicle (20) and a motor vehicle (24) or object that is offset in front of the other motor vehicle, as well as a speed difference ($\Delta v_{front,offset}$) between the other motor vehicle (20) and the motor vehicle (24) or object that is offset in front of the other motor vehicle, wherein the other motor vehicle (20) and the motor vehicle (24) or object that is offset in front of the other motor vehicle are in different lanes.

4. The control system according to claim 1, which for determining the instantaneous traffic situation is further configured and intended for determining a distance ($d_{behind, offset}$) between the other motor vehicle (20) and a motor vehicle that is located behind the other motor vehicle, as well as a speed difference ($\Delta v_{behind,offset}$) between the other motor vehicle (20) and the motor vehicle that is located behind the other motor vehicle, wherein the other motor vehicle (20) and the motor vehicle that is located behind the other motor vehicle are in different lanes.

5. The control system according to claim 4, which is further configured and intended for determining whether an additional motor vehicle is present between the other motor vehicle (20) and the host motor vehicle (10), and determining the host motor vehicle (10) to be the rear motor vehicle when no other motor vehicle is present between the other motor vehicle (20) and the host motor vehicle (10).

6. A control method, which in a host motor vehicle (10), based on surroundings data obtained from at least one surroundings sensor associated with the host motor vehicle (10), recognizes preceding motor vehicles and preferably stationary objects situated ahead, wherein the control method is carried out in particular by means of a control system, and the control method includes the following steps:

providing surroundings data to an electronic controller of the control system, the surroundings data representing an area in front of the host motor vehicle (10), detecting another motor vehicle (20), using the road, located in front of the host motor vehicle (10) by means of the at least one surroundings sensor, determining a lateral movement of the other motor vehicle (20) relative to a lane (12, 16) in which the other motor vehicle (20) or the host motor vehicle (10) is present, computing a movement-based likelihood of a lane change by the other motor vehicle (20), based on the determined lateral movement of the other motor vehicle, determining an instantaneous traffic situation in accordance with the surroundings data obtained by means of the surroundings sensor, computing a traffic situation-based likelihood of a lane change by the other motor vehicle (20), based on the determined instantaneous traffic situation, and computing an overall likelihood of a lane change by the other motor vehicle (20), based on the movement-based likelihood and the traffic situation-based likelihood, ascertaining an additional lane in which a motor vehicle in the area in front of the host motor vehicle is present, determining that the motor vehicle in the area in front of the host motor vehicle (10) is the other motor vehicle (20) that is to be detected, when the additional lane is adjacent to the host lane, the other motor vehicle (20) using the road is detected, over a predetermined time period or continuously, by means of the at least one surroundings sensor in order to determine the lateral movement of the other motor vehicle (20), wherein for determining the lateral movement of the other motor vehicle (20), a change in a distance ($d_{lateral}$) between a longitudinal axis (L) of the other motor vehicle (20) and a centerline (18), at least one lane boundary, or at least one lane marker of the lane (12, 16) in which the other motor vehicle (20) or the host motor vehicle (10) is present is determined during the predetermined time period or continuously, detecting additional motor vehicles (22, 24) using the road and/or objects located in front of the host motor vehicle (10) by means of the at least one surroundings sensor in order to determine the instantaneous traffic situation, and wherein for determining the instantaneous traffic situation, the control method includes the following additional step:

determining a distance ($d_{front}$) between the other motor vehicle (20) and an additional motor vehicle (22) or object located in front of the other motor vehicle, as well as a speed difference ($\Delta v_{front}$) between the other motor vehicle and the additional motor vehicle or object located in front of the other motor vehicle, wherein the other motor vehicle (20) and the additional motor vehicle (22) or object located in front of the other motor vehicle are present in the same lane.

7. The control method according to claim 6, wherein for determining the instantaneous traffic situation, the control method preferably includes one or more of the following additional steps:

determining a distance ($d_{front,offset}$) between the other motor vehicle (20) and a motor vehicle (24) or object that is offset in front of the other motor vehicle, as well as a speed difference ($\Delta v_{front,offset}$) between the other motor vehicle and the motor vehicle or object that is offset in front of the other motor vehicle, wherein the other motor vehicle (20) and the motor vehicle (24) or object that is offset in front of the other motor vehicle are in different lanes, and determining a distance ($d_{behind,offset}$) between the other motor vehicle (20) and a motor vehicle that is located behind the other motor vehicle, as well as a speed difference ($\Delta v_{behind,offset}$) between the other motor vehicle and the motor vehicle that is located behind the other motor vehicle, wherein the other motor vehicle (20) and the motor vehicle that is located behind the other motor vehicle are in different lanes, and the motor vehicle that is located behind the other vehicle is preferably the host motor vehicle (10).

* * * * *